(12) United States Patent
Hutchin

(10) Patent No.: US 7,372,569 B2
(45) Date of Patent: May 13, 2008

(54) METHOD OF CORRECTING ALIGNMENT ERRORS IN A SEGMENTED REFLECTIVE SURFACE

(75) Inventor: Richard A. Hutchin, Woodland Hills, CA (US)

(73) Assignee: Optical Physics Company, Calabasis, CA (US)

( * ) Notice: Subject to any disclaimer, the term of this patent is extended or adjusted under 35 U.S.C. 154(b) by 365 days.

(21) Appl. No.: 11/089,962

(22) Filed: Mar. 25, 2005

(65) Prior Publication Data

US 2006/0215160 A1 Sep. 28, 2006

(51) Int. Cl.
*G01B 11/00* (2006.01)
(52) U.S. Cl. .................... 356/399; 250/201.9
(58) Field of Classification Search .............. 250/201.9
See application file for complete search history.

(56) References Cited

U.S. PATENT DOCUMENTS 5,128,530 A * 7/1992 Ellerbroek et al. ...... 250/201.9

OTHER PUBLICATIONS

Aberration correction of segmented-aperture telescopes by using phase diversity□□David A. Carrara, Brian J. Thelen, Richard G. Paxman□□Veridian ERIM International, P.O. Box 134008, Ann Arbor, MI 48113.*

* cited by examiner

Primary Examiner—Tarifur Chowdhury
Assistant Examiner—Jonathon D Cook
(74) Attorney, Agent, or Firm—Connolly Bove Lodge & Hutz LLP

(57) ABSTRACT

An optical alignment apparatus comprising a plurality of subapertures and a plurality of detectors. The subapertures are optically coupled to a reflective surface which formed by a plurality of adjustable reflective segments. Each subaperture falls within one of two subsets. The first subset includes those subapertures that are positioned to receive light reflected from a single reflective segment. The second subset includes those subapertures that are positioned to receive light reflected across the abutting edges of adjacent reflective segments. Each detector is disposed at a focal plane of one of the subapertures and receives light reflected from that subaperture.

9 Claims, 8 Drawing Sheets

```
j=0                                j=J-1
 |                                   |
k=0 ── o      o      o      o ··· o o      o      o      o ··· o
                                          ℓ = k × J + j o      o      o      o ··· o       0 ≤ ℓ ≤ L-1
                             ⋮
k=K-1── o     o      o      o ··· o
```

METHOD OF CORRECTING ALIGNMENT ERRORS IN A SEGMENTED REFLECTIVE SURFACE

BACKGROUND OF THE INVENTION

1. Field of the Invention

The field of the present invention is optical systems, particularly optical systems which include at least one segmented reflective surface and devices for aligning the segments of the reflective surface.

2. Background

Imaging systems are frequently deployed on either airborne or orbiting platforms for intelligence gathering purposes. Over the years, image processing techniques have been developed which provide the intelligence provided through image analysis of terrestrial scenes. Most, if not all, of the image processing techniques benefit from 1) an increased image resolution and 2) an increased signal-to-noise (SNR) ratio. Both of these factors are improved as the size of the entrance aperture for the imaging system, which is typically defined by the size of the primary mirror, is increased. Unfortunately, the size of the entrance aperture is often constrained by the physical size of components that can be lifted into orbit using modern launch vehicle technology.

One solution to the physical size limitation is transporting the primary mirror in segments and assembling those segments at the platform to create a large primary mirror. A segmented mirror, however, introduces its own set of complications. Chief among the possible complications is misalignment of the segments, which may have many sources, including vibrations induced by platform motion and operation of system components such as gyros and coolers. To achieve proper functionality of the imaging system, the mirror segments are aligned in both "piston" and "tilt". "Piston alignment", also referred to herein as the "piston position", is the alignment of each segment along the z-axis, which is generally parallel to the optical axis of the mirror. A segment having an incorrect piston position is referred to as having "piston misalignment" or "piston error". "Tilt alignment", also referred to herein as the "tilt position", is the alignment of each segment relative to the x-y plane, which is orthogonal to the z-axis of each segment. A segment having an incorrect tilt position is referred to as having "tilt misalignment" or "tilt error". Both tilt and piston misalignments are highly undesirable because they introduce aberrations in the primary mirror, thus degrading the overall image quality achievable by the system.

Conventional adaptive optics have previously been designed to correct aberrations in an optical system and generally rely upon measuring the wavefront of light passing through the optics of the system using an unresolved bright light source. For airborne optical systems, this type of adaptive optics often proves unworkable because the scenes being imaged generally do not include such a bright light source. This difficulty may be avoided altogether by adoption of a different approach to correcting the optical aberrations.

SUMMARY OF THE INVENTION

The present invention is directed toward an optical alignment apparatus and a method of correcting alignment errors in a segmented reflective surface. Referring to the apparatus, a plurality of subapertures are optically coupled to a reflective surface which is formed by a plurality of adjustable reflective segments. A detector is disposed at the focal plane of each subaperture and is optically coupled to the associated subaperture. A processor is communicably coupled to each detector, and is also communicably coupled to a plurality of actuated hexapods, each of which is coupled to one of the reflective segments.

In a first separate aspect of the present invention, the subapertures are divided into two subsets. The first subset includes those subapertures that are positioned to receive light reflected from a single reflective segment. The second set of subapertures includes those subapertures that are positioned to receive light reflected across abutting edges of adjacent segments.

In a second separate aspect of the present invention, which builds on the first separate aspect, light is received by a subaperture within the first set of subapertures. Intensity measurements of the received light are made and compared with intensity measurements from a reference subaperture. The processor is adapted to determine errors in tilt alignment for the different segments using the intensity measurements.

In a third separate aspect of the present invention, which builds on the first separate aspect, light from each adjacent pair of reflective segments is received by a subaperture which is within the second set of subapertures. Intensity measurements of the received light are made, and the processor is adapted to determine errors in piston alignment between the adjacent pairs of reflective segments using the intensity measurements.

In a fourth separate aspect of the present invention, each reflective segment and each subaperture all have a hexagonal shape.

In a fifth separate aspect of the present invention relating to the method, a subaperture receives an image reflected across abutting edges of adjacent reflective segments. Spatial frequencies within the image are used to derive a phase plateau value. The phase plateau value is then used to resolve the piston difference between the adjacent reflective segments and the piston position of at least one of the adjacent reflective segments is adjusted accordingly.

In a sixth separate aspect of the present invention, which builds on the fifth separate aspect, the spatial frequencies used are characterized by separations in a predetermined direction. The separations may include those which are greater than d/2, where d represents the maximum width of the subaperture in the predetermined direction.

In a seventh separate aspect of the present invention, which builds on the fifth separate aspect, the phase plateau is derived first by measuring intensities of the image at select spatial frequencies. A Fourier Transform (FT) is then performed on the measured intensities. The Optical Transfer Function (OTF) of the subaperture is also determined at each of the select spatial frequencies. The phase plateau is derived using the FT of the measured intensities and the OTF of the subaperture at each spatial frequency.

In an eighth separate aspect of the present invention, any of the foregoing aspects may be employed in combination.

Accordingly, the present invention provides an improved optical alignment apparatus and an improved method of correcting alignment errors in a segmented reflective surface. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
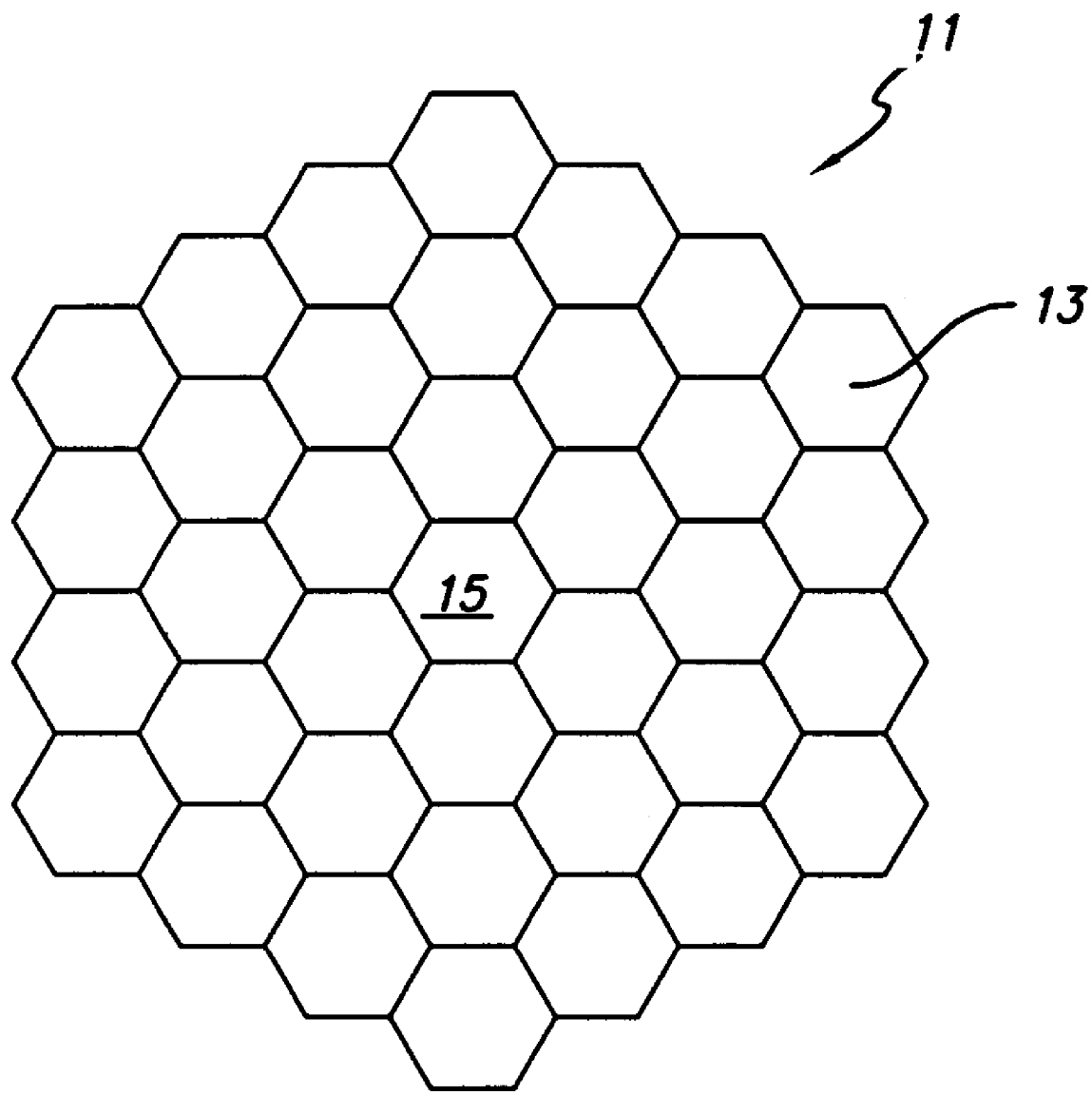
FIG. 1 illustrates a segmented mirror.

Turning in detail to the drawings, FIG. 1 illustrates a reflective surface 11 formed by thirty-seven reflective segments 13. In practice, any number of reflective segments may be used and the center segment 15 of the reflective surface may be omitted, depending upon the application. For example, for applications in which the reflective surface 11 forms the primary mirror and light is required to pass through the center of the reflective surface 11, the center segment 15 would not be present.

Figure 2:
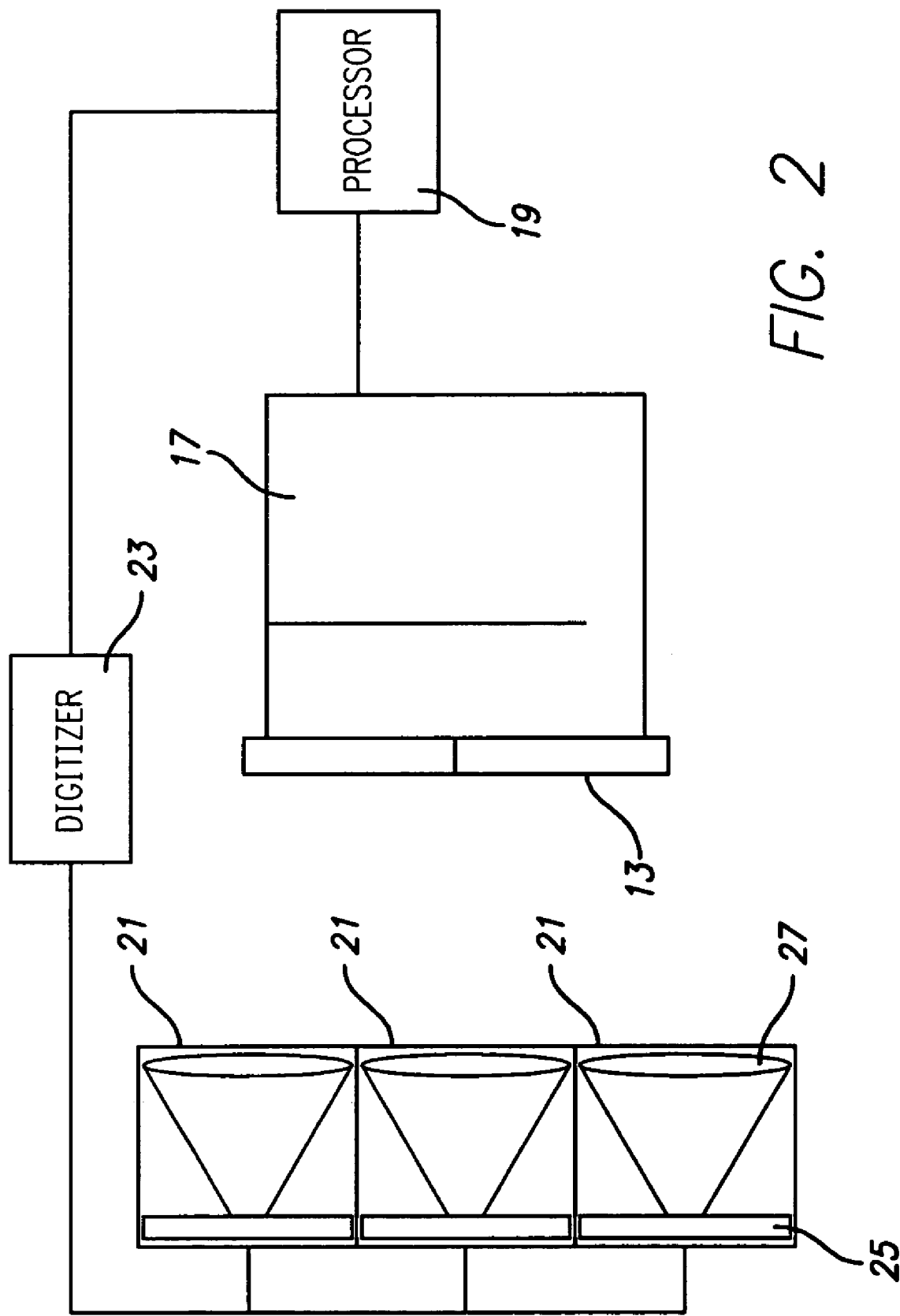
FIG. 2 schematically illustrates a segment of the mirror and the associated measurement and control elements.

Referring to FIG. 2, which illustrates the configuration of the optical alignment apparatus for each reflective segment, the reflective segment 13 is coupled to an actuated hexapod 17 which enables the reflective segment 13 to tilt and piston independently of all other reflective segments. A processor 19 is electronically coupled to and controls each hexapod 17. By controlling each hexapod 17, the processor 19 controls the tilt and piston position of the reflective segment 13. The processor 19 is also electronically coupled to the sensors 21, three of which are shown, through data acquisition electronics 23. Each sensor 21 includes a position sensitive detector 25 disposed at the focal plane of a lens 27. The lens 27 defines the subaperture for each respective sensor 21 and images light from one or more reflective segments, as described below, onto the position sensitive detector 25. Output signals from each position sensitive detector 25 are read out and digitized by the data acquisition electronics 23. The digitized signals are then passed to the processor 19 for analysis.

Figure 3:
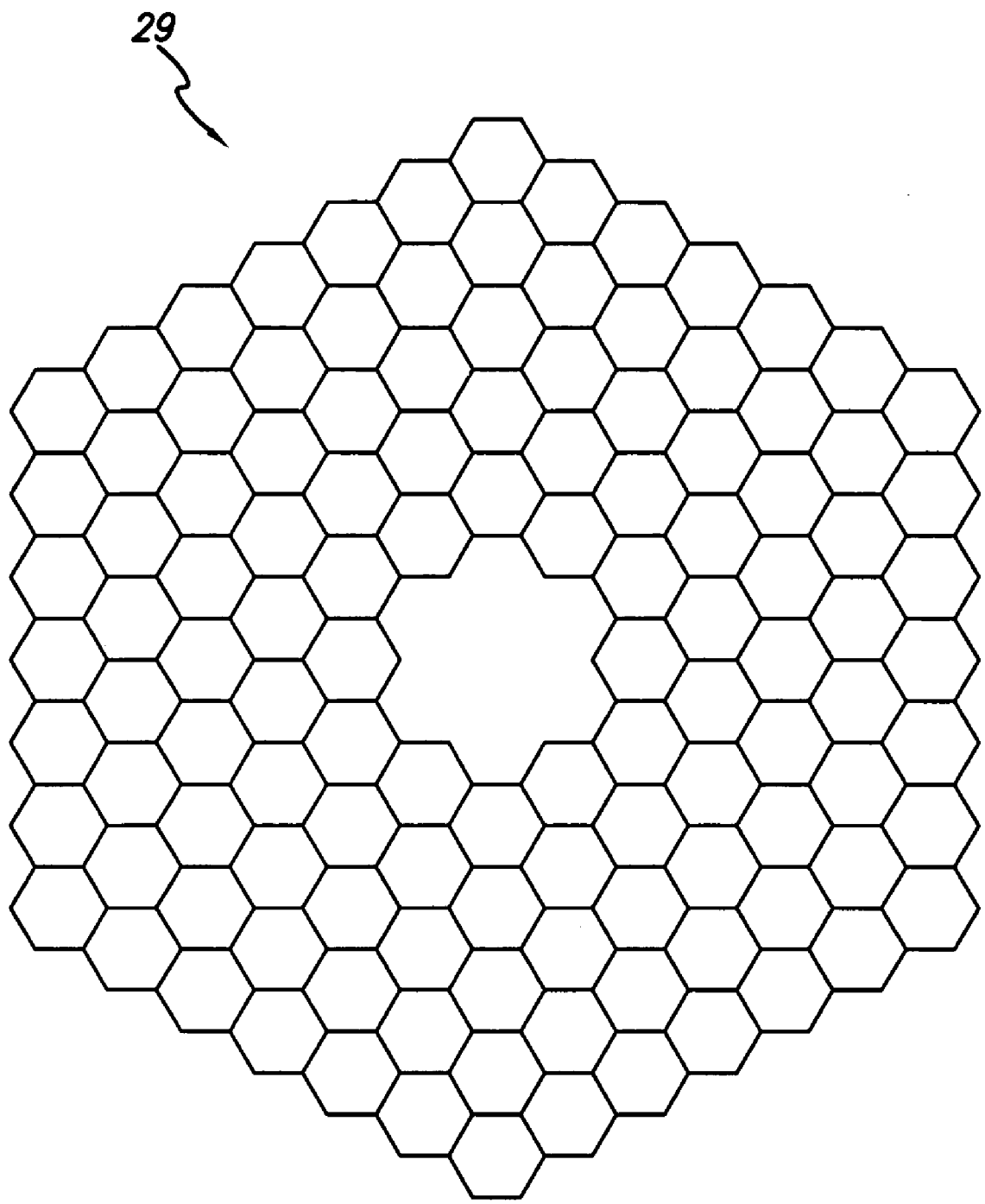
FIG. 3 schematically illustrates a subaperture array.
Figure 4:
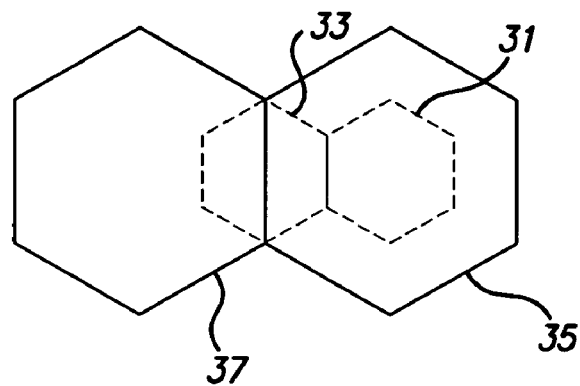
FIG. 4 illustrates a pair of subapertures schematically superimposed on adjacent mirror segments.

FIG. 3 illustrates a subaperture array 29 formed by 120 sensors, although more or fewer may be used as is appropriate for a particular configuration of the segmented reflective surface. The detectors associated with this sensor array form one or more focal plane arrays (FPA), where one FPA is preferred for most applications for the sake of simplicity. The subaperture array 29 is optically coupled to the segmented reflective surface 11 shown in FIG. 1 such that optical alignment of each subaperture falls into one of the two categorizations shown in FIG. 4.

Figure 5:
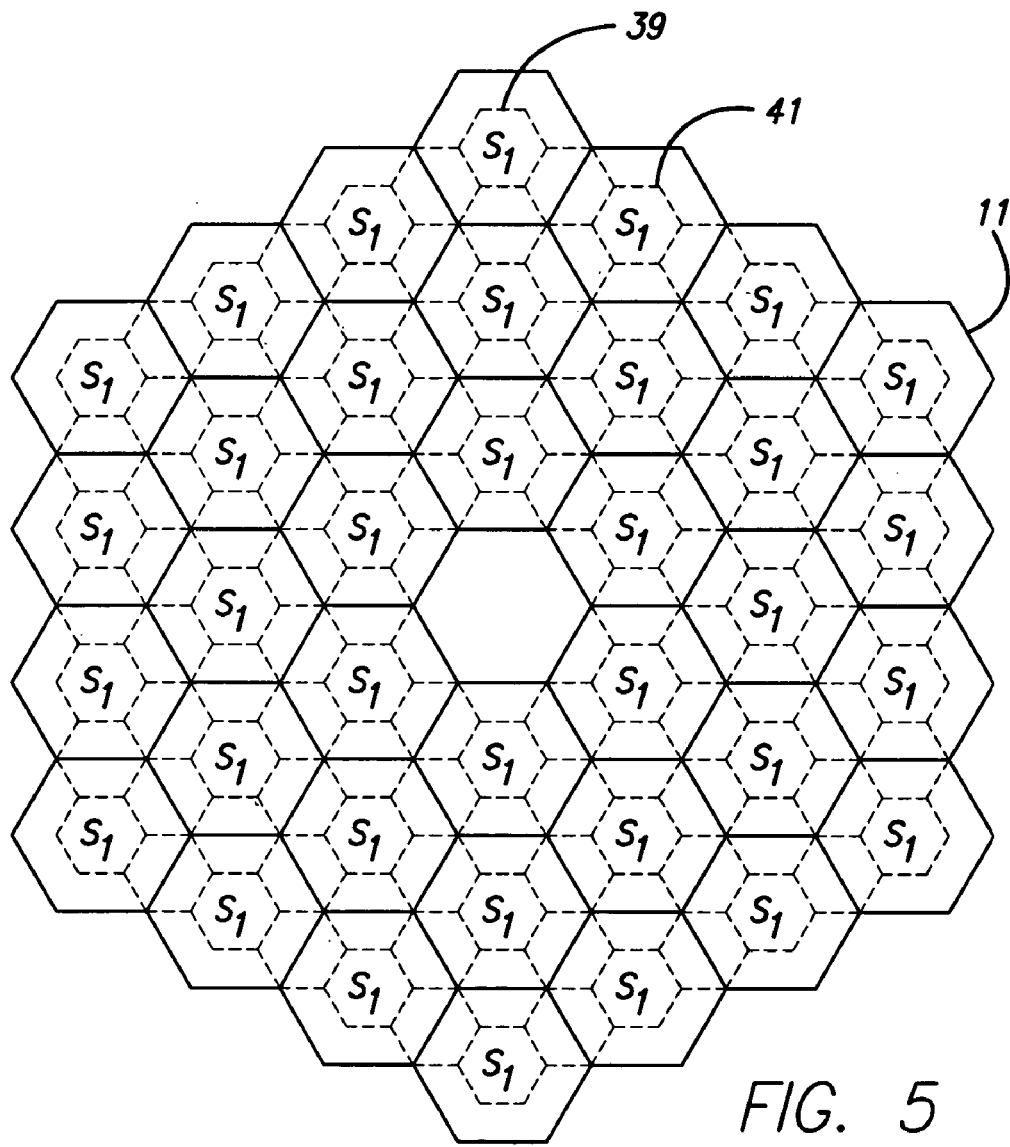
FIG. 5 illustrates the segmented mirror of FIG. 1 with a subaperture array schematically superimposed thereon.

For purposes of example only, two subapertures 31, 33 are shown superimposed over two reflective segments 35, 37. The first subaperture 31 receives light only from the first reflective segment 35. In contrast, the second subaperture 33 is positioned to receive light reflected across abutting edges of the reflective segments 35, 37. FIG. 5 illustrates an entire subaperture array 39 superimposed over the segmented reflective surface 11. In this configuration, two subsets of subapertures 41 are created. The first subset includes all subapertures 41 receiving light from only a single reflective element. The subapertures 41 in this first subset are denoted $S_1$, and are also referred to herein as "tilt subapertures". The second subset includes all subapertures 41 receiving light from two adjacent reflective segments. These subapertures 41 are not separately labeled, and are also referred to herein as "phasing subapertures".

The subapertures in the first subset are used to determine and correct the tilt error of each associated reflective segment. Like all processes described below, this is done while the overall optical system images actual scenes. An example of the type of scene that may be used is found in the context of imaging satellites. Satellites may be used to image many different types of terrestrial scenes, which may be situated within mountains, forests, deserts, or cities. Such scenes are reflected by the reflective surface, i.e. the primary mirror, and are imaged by the subapertures forming the sensor array.

The principle underlying detection and correction of the tilt error for each reflective segment is that the phases of the Fourier Transform components of an image are shifted in a precise and different manner when the wavefront from any single reflective segment is tilted. Specifically, the phases arising out of the Fourier Transform are shifted linearly with increasing spatial frequency. Such linear shifts in the phases correspond to a shift in the spatial domain. This shift can and is computed to determine the tilt of a reflective segment.

Figures 6, 7:
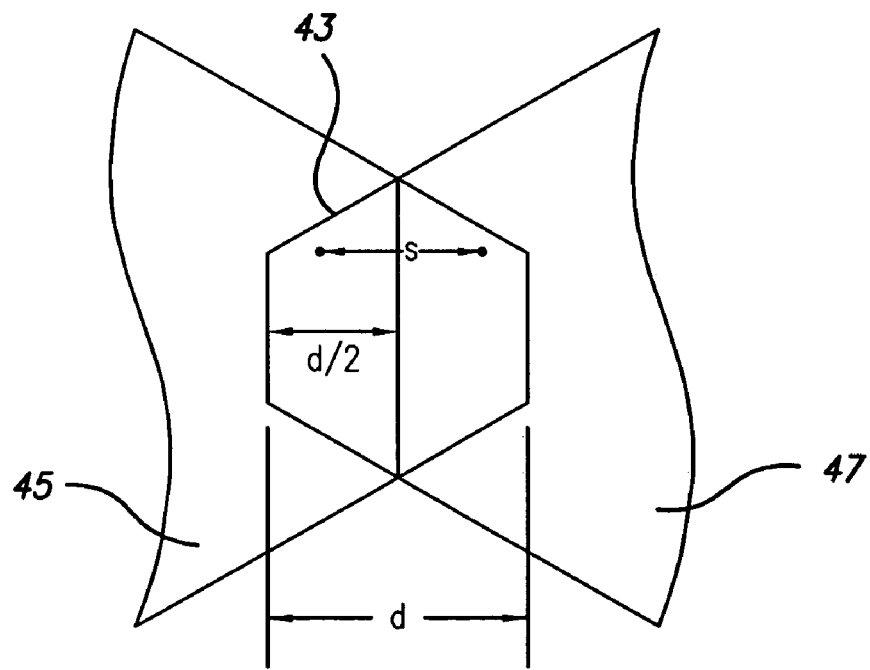
FIG. 6 illustrates the ordering of an array for tilt error computations.
FIG. 7 schematically illustrates a subaperture placed over abutting edges of two mirror segments.

The local tilt in a target subaperture may be calculated by observing the difference between the image from the target subaperture and the image from a reference subaperture. As the local tilt changes relative to the tilt of the reference subaperture, the image is translated on the position sensitive detector associated with the target subaperture. The amount of translation may be used to infer tilt. This technique may be applied to determine the tilt of a particular reflective segment or the local tilt in a high order subaperture within a reflective segment. The data is processed over an array of L subapertures, ordered by $0<l<L-1$ as shown in FIG. 6. Then the change in intensity from the reference frame to the $l^{th}$ subaperture is:

$$\Delta I_l = I0_l - In_l. \quad (1)$$

An estimate of the reference intensity may be formulated by the intensities in the $n^{th}$ frame and the product of the displacements with the spatial intensity gradients as follows:

$$I0 = In_l + \Delta x \cdot \left(\frac{d}{dx} In_l\right) + \Delta y \cdot \left(\frac{d}{dy} In_l\right). \quad (2)$$

The mean square error of this estimate is:

$$E = \sum_l \left[I0 - \left[In_l + \Delta x \cdot \left(\frac{d}{dx} In_l\right) + \Delta y \cdot \left(\frac{d}{dy} In_l\right)\right]\right]^2. \quad (3)$$

By estimating the intensity gradients in each pixel using changes between pixels, the displacements in tilt, $\Delta x$ and $\Delta y$, for the entire image, can be calculated subject to the condition of minimizing the mean square error, E, as follows:

$$\frac{d}{d\Delta x}E = \qquad (4)$$
$$2\cdot\sum_{l}\left[I0_l - \left[In_l + \Delta x\cdot\left(\frac{d}{dx}In_l\right) + \Delta y\cdot\left(\frac{d}{dy}In_l\right)\right]\right]\cdot\left(\frac{d}{dx}In_l\right) = 0; \text{ and}$$

$$\frac{d}{d\Delta y}E = \qquad (5)$$
$$2\cdot\sum_{l}\left[I0_l - \left[In_l + \Delta x\cdot\left(\frac{d}{dx}In_l\right) + \Delta y\cdot\left(\frac{d}{dy}In_l\right)\right]\right]\cdot\left(\frac{d}{dy}In_l\right) = 0.$$

This leads to the set of simultaneous equations:

$$\Delta x\cdot\sum_l\left(\frac{d}{dx}I0\right)^2 + \Delta y\cdot\sum_l\left[\left(\frac{d}{dx}I0\right)\cdot\left(\frac{d}{dy}I0\right)\right] = \qquad (6)$$
$$\sum_l\left[(I0-In_l)\cdot\left(\frac{d}{dx}I0\right)\right]; \text{ and}$$

$$\Delta x\cdot\sum_l\left[\left(\frac{d}{dx}I0\right)\cdot\left(\frac{d}{dy}I0\right)\right] + \Delta y\cdot\sum_l\left(\frac{d}{dy}I0\right)^2 = \qquad (7)$$
$$\sum_l\left[(I0-In_l)\cdot\left(\frac{d}{dy}I0\right)\right].$$

Finally, using Cramer's rule and simplifying, the solutions for the displacements in tilt, $D_x$ and $D_y$, are as follows:

$$\begin{pmatrix}\Delta x\\ \Delta y\end{pmatrix} = \frac{\begin{bmatrix}\left[\sum_l[dy(I0)]^2\right]\cdot\left[\sum_l[\Delta I_l\cdot dx(I0)]\right] - \left[\sum_l[dx(I0)\cdot dy(I0)]\right]\cdot\left[\sum_l[\Delta I_l\cdot dx(I0)]\right] -\\ \left[\sum_l[dx(In_l)\cdot dy(I0)]\right]\cdot\left[\sum_l[\Delta I_l\cdot dx(I0)]\right] + \left[\sum_l[dx(I0)]^2\right]\cdot\left[\sum_l[\Delta I_l\cdot dy(I0)]\right]\end{bmatrix}}{\left\| \begin{array}{cc} \sum_l[dx(I0)]^2 & \sum_l[dx(I0)\cdot dy(In_l)] \\ \sum_l[dx(I0)\cdot dy(I0)] & \sum_l[dy(I0)]^2 \end{array} \right\|}, \qquad (8)$$

where the notation of equation (8) has been simplified by:

$$\Delta I_l = I0 - In_l; \qquad (9)$$
$$dx(I0) = \frac{d}{dx}I0; \text{ and} \qquad (10)$$
$$dy(I0) = \frac{d}{dy}I0. \qquad (11)$$

Likewise, the subapertures in the second subset may be used to determine and correct the relative piston errors in the associated reflective segments. FIG. 7 shows a single phasing subaperture 43 superimposed across two reflective segments 45, 47. This phasing subaperture 43 is positioned to receive light from both reflective segments 45, 47, and thus falls within the second subset of subapertures discussed above. For purposes of the ensuing description, the width of the phasing subaperture 43 in the x-direction is denoted d, and the separation in the x-direction between any two points on the reflective segments 45, 47, the two points falling within the superimposed subaperture, is denoted s.

Figure 8:
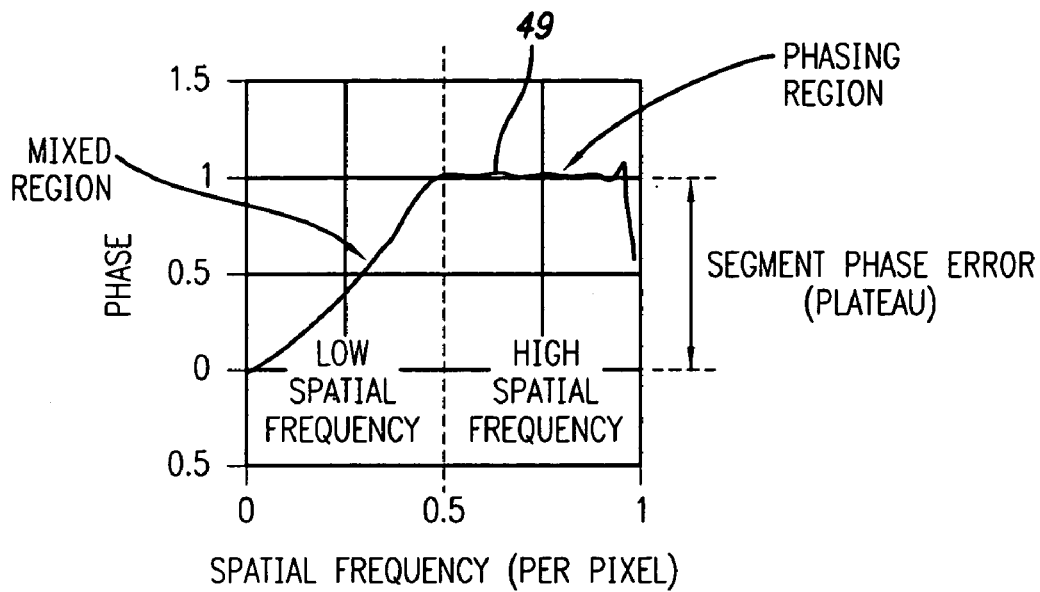
FIG. 8 is a graph illustrating the phase plateau arising from adjacent mirror segments.

One algorithm to determine the relative piston position of two adjacent reflective segments is based on the principle of a phasing plateau in the spatial frequency domain, which is shown in FIG. 8. Referring back to FIG. 7, when the separation, s, of two interfering points is greater than d/2, then one point must be on one reflective segment and the other point on the other reflective segment. Since spatial frequency, K, is a linear function of the separation, s, all spatial frequencies which are contained in the image of the phasing subaperture 43 and which correspond to separations greater than d/2 will exhibit a constant optical path difference (OPD) error (assuming that both segments are already aligned in tilt). This OPD error is also referred to herein as the phasing error, and it is proportional to the difference in piston position between the two adjacent reflective segments 45, 47.

The underlying theory for the phasing plateau is relatively straight forward. The convolution theorem states that an image can be calculated by the convolution of the object with the point spread function (PSF), provided that the PSF is invariant. Computationally, this is equivalent to saying that the Fourier Transform of an image is equal to the product of the Fourier Transform of the object with the Fourier Transform of the PSF, where the PSF is the image that is produced by a point-source object in the plane conjugate to the image plane. The Fourier Transform of the PSF is commonly referred to as the Optical Transfer Function (OTF) because it connects the Fourier Transforms of the object and image through multiplication.

When an image is made for a subaperture which overlaps two reflective segments, as is shown in FIG. 7, the image is convolved with the PSF of the segmented aperture. Mathematically, the OTF is the autocorrelation of the subaperture wavefront. Using the vector form of spatial frequencies and distances, this means that each value in the OTF(K) is the sum of all points having a separation, s, equal to $\lambda/K$, where $\lambda$ is the wavelength used in forming the image.

Whenever the separation, s, in the x direction exceeds one-half the segment diameter, d/2, then the left point must always be on the left segment and the right point must always be on the right segment. Any piston difference between two adjacent reflective segments will result in a constant OPD error in the OTF. The phase shift (in cycles) will then be the OPD error divided by the mean wavelength. Since there are many spatial frequencies for all separations, s, which are greater than d/2, this creates the phase plateau 49 shown in FIG. 8. The magnitude of the phase plateau indicates the amount of phasing error between the two adjacent reflective segments.

The mathematical equations used to compute the phase error are summarized below:

$$I_{TiltSubAp}(\overline{K}) = I_{Scene}(\overline{K}) \cdot OTF_{TiltSubAp}(\overline{K}), \quad (12)$$

where:

$$I_{TiltSubAp}(\overline{K}) \quad (13)$$

is the Fourier Transform of a reference tilt subaperture intensity at spatial frequency K, $$I_{TiltSubAp}(\overline{K}) \quad (14)$$

is the Fourier Transform of the scene intensity from the reference tilt subaperture at spatial frequency K, and $$OTF_{TiltSubAp}(\overline{K}) \quad (15)$$

is the OTF of the reference tilt subaperture at spatial frequency K; and $$I_{EdgeAp}(\overline{K}) = I_{Scene}(\overline{K}) \cdot OTF_{EdgeAp}(\overline{K}), \quad (16)$$

where:

$$I_{EdgeAp}(\overline{K}) \quad (17)$$

is the Fourier Transform of a phasing subaperture image at spatial frequency K, and $$OTF_{EdgeAp}(\overline{K}) \quad (18)$$

is the OTF of the phasing subaperture at spatial frequency K. Taking the complex conjugation of equation (12), these two equations result in:

$$I_{EdgeAp}(\overline{K}) \cdot \overline{I_{TiltSubAp}(\overline{K})} = (I_{Scene}(\overline{K}))^2 \cdot OTF_{EdgeAp}(\overline{K}) \cdot \overline{OTF_{TiltSubAp}(\overline{K})}. \quad (19)$$

The Fourier Transform of the image from the reference tilt subaperture is conjugated and multiplied by the Fourier Transform of the image from an adjacent phasing subaperture to cancel the phase of the scene from the ensuing calculation. Consequently, only the phase resulting from the piston error between the two reflective segments remains. This makes the algorithm independent of the scene being imaged except for any present signal-to-noise ratio (SNR). The noise performance may be improved by increasing the scene illumination and the scene structure. However, so many pixels are used for the several hundred Hz measurement rate, that even desert scenes at sunrise tend to function very well for purposes of these calculations.

The actual determination of the phase error can be made by averaging all of the plateau values:

$$\theta_{PhaseError} = \arg\left[\sum_{K > Nyquist\ Pixel} \left(I_{EdgeAp}(\overline{K}) \cdot \overline{I_{TiltSubAp}(\overline{K})}\right)\right]. \quad (20)$$

The above equation exploits all of the spatial frequencies above the nyquist pixel. It is, however, possible to also use data corresponding to the region below the nyquist pixel by computing a normalization function, F(K), as follows:

$$F(\overline{K}) = \frac{\int Ap(\overline{x}) \cdot \overline{Ap(\overline{x} - \overline{s})} \cdot H(\overline{x} - \overline{s}) d\overline{x}}{\int Ap(\overline{x}) \cdot \overline{Ap(\overline{x} - \overline{s})} d\overline{x}}, \quad (21)$$

where $$Ap(\overline{x}) \quad (22)$$

is the aperture function for a hexagonal aperture;

$$H(\overline{x} - \overline{s}) \quad (23)$$

is the Heaviside step function; and $$\overline{K} \quad (24)$$

is the spatial frequency corresponding to the separation, s.

Applying this normalization permits exploitation of the lower spatial frequencies where the SNR is improved. The phase error between adjacent reflective segments may then be calculated by:

$$\theta_{PhaseError} = \arg\left[\sum_{K > Nyquist\ Pixel} \left(\frac{I_{EdgeAp}(\overline{K}) \cdot \overline{I_{TiltSubAp}(\overline{K})}}{F(\overline{K})}\right)\right]. \quad (25)$$

Figure 9:
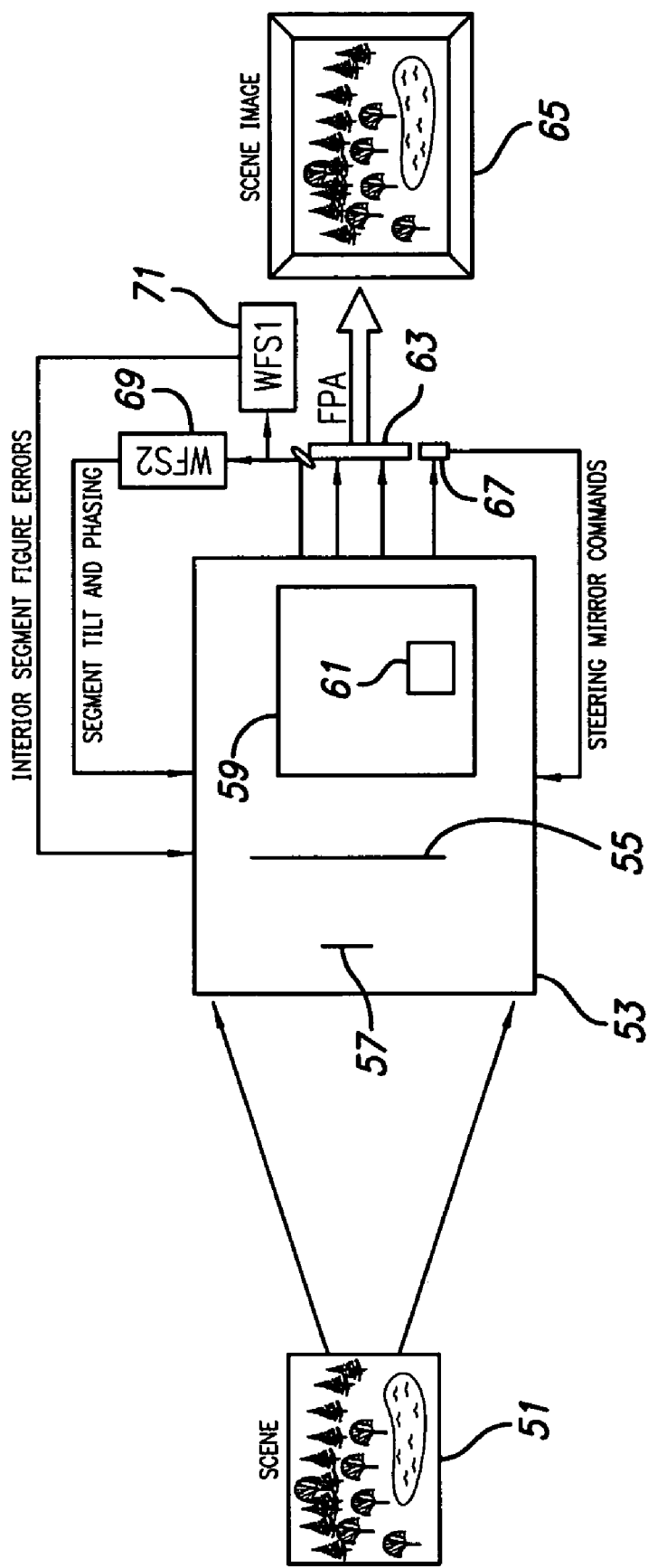
FIG. 9 schematically illustrates a system for correcting alignment errors of a segmented mirror.

A schematic of the control processes is shown in FIG. 9. Light from the scene 51 being imaged enters the optical system 53. This optical system 53 includes a segmented primary mirror 55, a secondary mirror 57, and at least one or more tertiary optical elements 59, at least one of which is a fast steering mirror 61. All of the optical elements within the optical system 53 are optically coupled, and in combination define the focal plane of the optical system 53. An FPA 63 is disposed at a focal plane of the optical system 53 to record the scene image 65 emerging from the optical system 53. A separate tracker FPA 67 is also optically coupled to the optical system 53 and is utilized to correct full aperture tilt of the optical system 53 by making appropriate adjustments to the fast steering mirror 61. Two additional wavefront sensors 69, 71 are also optically coupled to the optical system, each of which includes an FPA. The first wavefront sensor 69 is utilized to correct high-order aberrations of the optical system. The second wavefront sensor 71 is utilized to correct tilt and piston errors arising from misalignment of the reflective segments forming the primary mirror 55.

The correction process described in detail below uses real scenes to make the necessary corrections and can work well even with a pixel SNR as low as 0.5. In this process, the filter SNR increases as the square root of the total number of samples, which in this case is the total number of pixels in the image. The process can therefore detect and measure signals in the raw data which are completely invisible to the naked eye. By way of example, if the image size is 2000× 2000 pixels, which is sufficiently large for high bandwidth scene tracking, then the multiplier to the pixel SNR is the square root of the number of pixels. Further, if the pixel SNR is as low as 0.5, then the image SNR is 1000. This is within an entirely acceptable range for space-based optical systems.

As indicated above, the fast steering mirror 61 is used to correct the tracking, i.e., full aperture tilt, of the optical system 53. The tracking FPA 67 compares an ordinary full-aperture image to a previous full-aperture image during the integration time of an exposure. The algorithm discussed above in relation to the tilt of a single reflective segment may be applied to determine the image translation relative to the earlier reference image. The image translation is corrected using the fast steering mirror 61, which is preferably operated at a high bandwidth. Since the subapertures used to measure segment tilt and piston are much smaller than the full aperture, they are proportionately less affected by line of sight jitter. A typical system would converge the segment tilt loop first, followed by the segment phasing loop and finally stabilize the image using the scene tracker. However, one may also begin to operate the scene tracker effectively once the segment tilt loop has been closed. The resulting image will not be as sharp as a final image but it will still provide a significant level of stabilization which may enhance the performance of the phasing sensor.

Thus typically the first step in the overall process is to correct the tilt error of the reflective segments. The tilt error correction is done first because tilt errors can give rise to apparent phase differences which might be incorrectly interpreted as piston errors. Thus, for purposes of efficiency, tilt errors are corrected before piston errors.

The control algorithms can be based either on Optimal Estimators or Gaussian Estimators. Since a direct measurement of the tilt errors is being made, the Gaussian Estimator is preferred. The creation of a Gaussian Estimator is based on a simulation of the segmented mirror and an appropriate sensor, although a simulation of the actual system may also be used. Based on such a simulation, a response matrix, R, is formulated to characterize the change in the segment tilt measurements, M, based on a unit change in the reflective segment tilt of a segmented direct measurement corrector, C:

$$M = R \cdot C \quad (26)$$

The weights, W, to be applied to the data can be calculated with the Pseudo-Inverse of the Response matrix:

$$W = (R^T \cdot R)^{-1} \cdot R^T \quad (27)$$

The data ensemble is the ordered vector of tilts on each reflective segment. The weights, W, are applied to the data to formulate an estimate, E, of the tilts to be corrected:

$$E = W \cdot M \quad (28)$$

The above estimates are applied to a conventional control loop until a point is reached where improvements in the Strehl ratio fall below a predetermined value. This predetermined value may be 0.01, or as much as 0.1. This value may also be outside of this range, as the value depends upon the total amount of error correction required for a particular optical system and its intended application.

After completion of the tilt error control loop, an additional control loop for correction of piston errors is initiated. This second control loop is performed simultaneously with continuing the tilt correction control loop to decrease the influence any remaining tilt error has on measurements of piston error. The same type of Gaussian Estimator is used for this additional control loop, although a statistically optimized estimator may also be used if the statistics of the disturbance are known in advance. For this additional control loop, the data vector is expanded to include phase difference measurements from phasing subapertures along with tilt measurements from tilt subapertures. Since there are up to six phase difference measurements for every hexagonal reflective segment, the response matrix and the weight matrix are rectangular rather than square. The Gaussian Estimator calculates estimates all of the piston errors and tilt errors of all of the segments based on the entire data ensemble, thereby minimizing the error due to noise.

Figure 10:
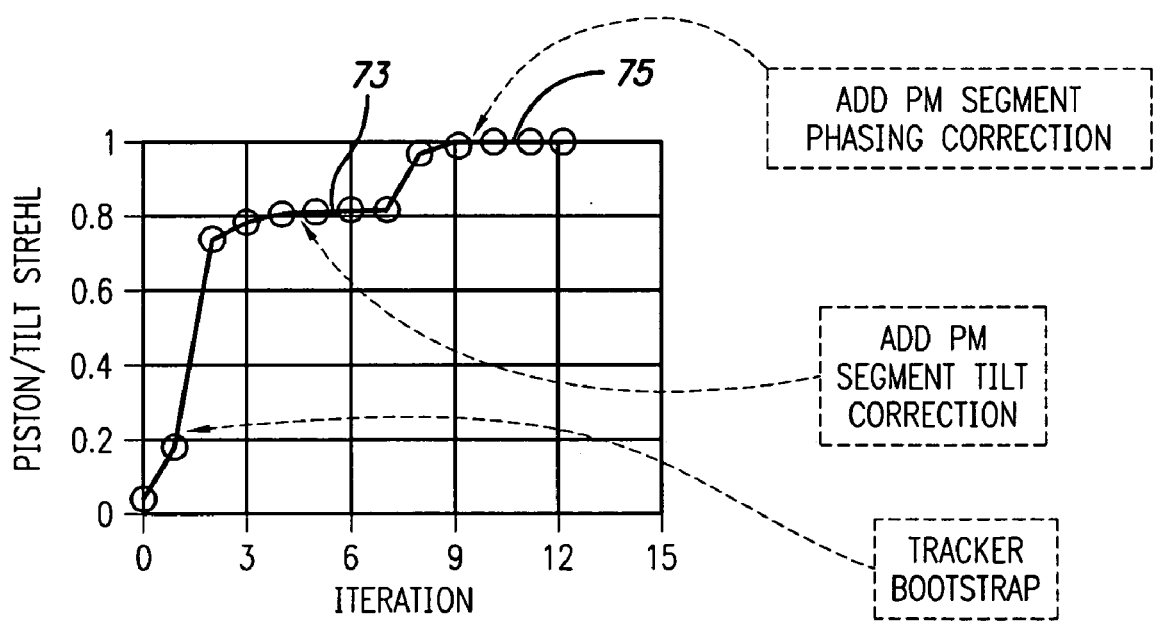
FIG. 10 is a graph illustrating the aberration reduction in an optical system having a segmented mirror as an iterative correction process is employed.

FIG. 10 shows the improvements in the Strehl ratio for the optical system as tracker correction is implemented, followed by the tilt correction and the piston correction. As the tracker loop is closed the Strehl ratio improves from approximately 0.05. Turning on the tilt control loop further improves the Strehl ratio until the correction converges to a plateau 73 of about 0.80. Finally, adding the phase control loop leads to a plateau 75 as the Strehl ratio approaches unity with each subsequent iteration. The closer the Strehl ratio is to unity, the truer the tilt and piston alignments are for each reflective segment.

High order modes within each segment may also be corrected, assuming that the high-order aberrations are sufficiently degrading to warrant such a correction. These modes are independent of the rigid body errors in the segmented primary mirror and generally arise from sources such as manufacturing defects in individual optical components, contamination of the optical surfaces, and thermal distortions of optical surfaces.

The control process for correcting these high-order aberrations is essentially the same for optical systems with and without segmented optics. The principle difference is that with segmented optics, the high-order corrections are performed spatially over each segment independently, while without segmented optics the corrections are applied across the whole aperture.

Figure 11:
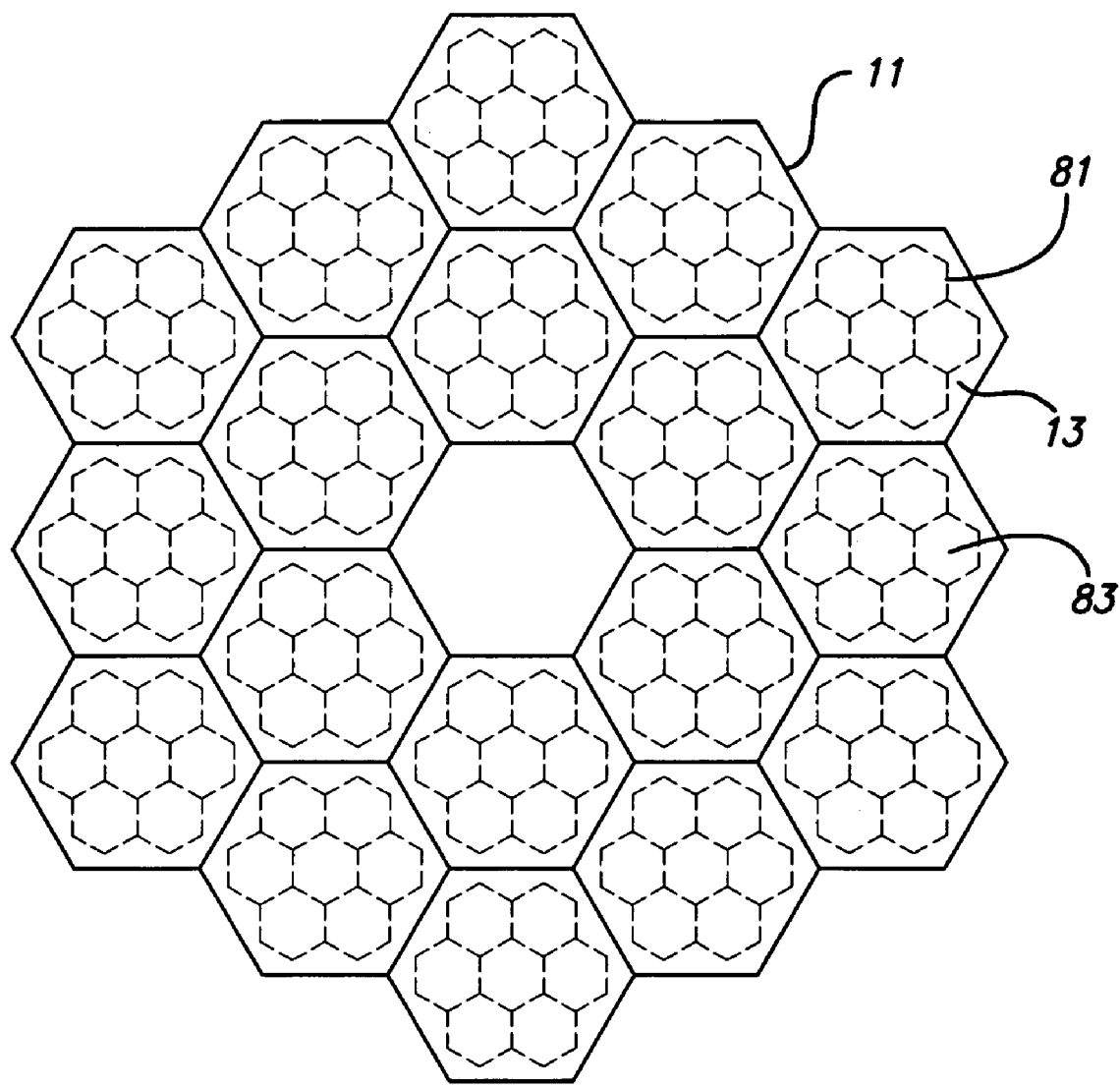
FIG. 11 illustrates the segmented mirror of FIG. 1 with another embodiment of a subaperture array schematically superimposed thereon.

With a segmented primary mirror, the spatial sampling of a wavefront is made across each segment. In order to detect and correct the high-order aberrations with segmented optics, the wavefront is sampled multiple times across each segment. FIG. 11 illustrates a subaperture array 81 superimposed on a segmented mirror 11 (note that the subapertures in the second subset of subapertures are not shown in FIG. 11 for purposes of clarity). This subaperture array 81 may be used to correct high-order aberrations. This subaperture array 81 has a cluster 83 of seven subapertures sampling the interior of each reflective segment 13, although as few as four and more than seven may also be employed. Each subaperture images the same real scene, and the phase of the Fourier Transform from each subaperture is compared with the others. A perfect wavefront will result in each Fourier Transform being identical to the others. In contrast, high-order aberrations will show up as different tilt shifts in the wavefront of each subaperture. These local tilts may be combined, usually with the Gaussian Estimator techniques described above, to identify and correct any high-order aberrations which are present.

Conveniently, data from these high-order error measurements may also be used to determine the tilt error of any reflective segment by using the tilt error algorithms described above. If this approach is taken, the array will consist of the subapertures corresponding to the segment for which the tilt error is being calculated.

Thus, an improved optical alignment apparatus and an improved method of correcting alignment errors in a segmented reflective surface are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method of correcting alignment errors in a segmented reflective surface, the method comprising:
    receiving through a subaperture an image reflected across abutting edges of adjacent reflective segments of the reflective surface, the adjacent reflective segments having an unknown piston difference;
    deriving a phase plateau value using spatial frequencies of the image;
    resolving the unknown piston difference using the phase plateau value; and
    adjusting a piston position of at least one of the adjacent reflective segments.

2. The method of claim 1, wherein deriving a phase plateau value includes determining optical path differences for select spatial frequencies and deriving the phase plateau value from the optical path differences.

3. The method of claim 1, wherein the spatial frequencies are characterized by separations in a predetermined direction.

4. The method of claim 3, wherein the spatial frequencies are further characterized by separations which are greater than d/2, where d represents a maximum width of the subaperture in the predetermined direction.

5. A method of correcting alignment errors in a segmented reflective surface, the method comprising:
- receiving through a subaperture an image reflected across abutting edges of adjacent reflective segments of the reflective surface, the adjacent reflective segments having an unknown piston difference;
- determining optical path differences for select spatial frequencies of the image, wherein the select spatial frequencies are characterized by separations in a predetermined direction, the separations being greater than d/2, where d represents a maximum width of the subaperture in the predetermined direction;
- deriving a phase plateau value using the optical path differences;
- resolving the unknown piston difference using the phase plateau value; and
- adjusting a piston position of at least one of the adjacent reflective segments.

6. A method of correcting alignment errors in a segmented reflective surface, the method comprising:
- receiving an image through a first subaperture following reflection of the image across abutting edges of adjacent reflective segments of the reflective surface, wherein the adjacent reflective segments have an unknown piston difference;
- measuring first subaperture intensities at select spatial frequencies of the image; calculating a first subaperture image Fourier Transform (FT) for each of the measured first subaperture intensities;
- determining a first subaperture Optical Transfer Function (OTF) at the select spatial frequencies;
- deriving a phase plateau value using each first subaperture image FT and each first subaperture OTF;
- resolving the unknown piston difference using the phase plateau value; and
- adjusting a piston position of at least one of the adjacent reflective segments.

7. The method of claim 6, wherein the select spatial frequencies consist of spatial frequencies characterized by separations in a predetermined direction.

8. The method of claim 7, wherein the select spatial frequencies consist of spatial frequencies characterized by separations which are greater than d/2, wherein d represents a maximum width of the first subaperture in the predetermined direction.

9. The method of claim 6, wherein deriving the phase plateau value includes:
- receiving the image through a second subaperture following reflection of the image off one of the two adjacent reflective segments;
- measuring second subaperture intensities at the select spatial frequencies;
- calculating a second subaperture image FT for each of the measured second subaperture intensities;
- determining a second subaperture OTF at the select spatial frequencies; and
- deriving the phase plateau value using each second subaperture image FT and each second subaperture OTF to cancel out a phase of the image within each first subaperture image FT and each first subaperture OTF.

* * * * *